US010399235B2

(12) United States Patent
Ou et al.

(10) Patent No.: US 10,399,235 B2
(45) Date of Patent: Sep. 3, 2019

(54) PICK-UP AND PLACEMENT TOOLS FOR ITEMS HAVING HOOK PORTION AND PUSHER

(71) Applicant: NIKE, Inc., Beaverton, OR (US)

(72) Inventors: Feng-Ming Ou, Taichung (TW); Yu-Hsi Hsing, Taichung (TW); Chia-Chi Yang, Taichung (TW)

(73) Assignee: NIKE, Inc., Beaverton, OR (US)

( * ) Notice: Subject to any disclaimer, the term of this patent is extended or adjusted under 35 U.S.C. 154(b) by 35 days.

(21) Appl. No.: 15/342,866

(22) Filed: Nov. 3, 2016

(65) Prior Publication Data

US 2017/0050324 A1 Feb. 23, 2017

Related U.S. Application Data

(63) Continuation of application No. 14/049,903, filed on Oct. 9, 2013, now abandoned.

(51) Int. Cl.
*B25J 15/00* (2006.01)
*B25J 11/00* (2006.01)

(52) U.S. Cl.
CPC ......... *B25J 15/0033* (2013.01); *B25J 11/005* (2013.01); *B25J 15/00* (2013.01); *B25J 15/008* (2013.01)

(58) Field of Classification Search
CPC .................................................. B25J 15/0033
See application file for complete search history.

(56) References Cited

U.S. PATENT DOCUMENTS

| 5,945,901 A * | 8/1999 | Coleman, Jr. ......... H01F 7/0257 335/285 |
| 9,061,422 B2 * | 6/2015 | Ruschulte ............ B25J 15/0023 |
| 2003/0173788 A1 * | 9/2003 | Fussell ...................... E01H 1/12 294/212 |

(Continued)

FOREIGN PATENT DOCUMENTS

| CA | 2830869 A1 | 9/2012 |
| CN | 2143626 Y | 10/1993 |

(Continued)

OTHER PUBLICATIONS

Non-Final Office Action dated Mar. 30, 2016 for U.S. Appl. No. 14/049,903, 9 pages.

(Continued)

*Primary Examiner* — Gerald McClain
(74) *Attorney, Agent, or Firm* — Shook, Hardy & Bacon L.L.P.

(57) ABSTRACT

An item with fibers may be picked up and placed using a tool head with hooks that engage the fibers. The tool head may comprise at least one hook portion and at least one contact surface adjacent to the hook portion. The hooks that engage the fibers may extend from the hook portion. The tool head may be actuatable between at least a first configuration that permits the hooks to engage the fibers and a second configuration that does not permit the hooks to engage the fibers. An item may be picked up at a starting location with a tool head in the first configuration and placed at a placement location by moving the tool head and then actuating the tool head to the second configuration.

21 Claims, 10 Drawing Sheets

(56) References Cited

U.S. PATENT DOCUMENTS

| | | | |
|---|---|---|---|
| 2005/0151385 A1* | 7/2005 | Autumn | B08B 7/0028 |
| | | | 294/86.4 |
| 2013/0209209 A1 | 8/2013 | Fukudome et al. | |
| 2013/0310980 A1* | 11/2013 | Matsuoka | B25J 15/0023 |
| | | | 700/260 |
| 2014/0010628 A1* | 1/2014 | Ruschulte | B25J 15/0023 |
| | | | 414/800 |

FOREIGN PATENT DOCUMENTS

| | | | | |
|---|---|---|---|---|
| CN | 1642695 | | 7/2005 | |
| CN | 201485629 U | | 5/2010 | |
| CN | 102648442 | | 8/2012 | |
| CN | 103240744 | | 8/2013 | |
| DE | 102011014674 A1 * | | 9/2012 | |
| JP | 2004174685 A | | 6/2004 | |
| JP | 2010000560 A | | 7/2010 | |
| JP | 2012152860 A * | | 8/2012 | B25J 15/0023 |
| TW | 224991 B | | 6/1994 | |

OTHER PUBLICATIONS

Final Office Action dated Jul. 7, 2016 for U.S. Appl. No. 14/049,903, 9 pages.

Office Action dated May 18, 2017 in European Patent Application No. 14782015.3, 7 pages.

* cited by examiner

PICK-UP AND PLACEMENT TOOLS FOR ITEMS HAVING HOOK PORTION AND PUSHER

CROSS-REFERENCE TO RELATED APPLICATION

This application is a continuation of co-pending U.S. patent application Ser. No. 14/049,903, filed Oct. 9, 2013, and titled "Pick Up and Placement Tools for Items with Hook Portion and Pusher," the contents of which is incorporated by reference in this application in its entirety.

STATEMENT REGARDING FEDERALLY SPONSORED RESEARCH OR DEVELOPMENT

Not applicable.

TECHNICAL FIELD

The present invention relates to a tool for picking up and placing pliable items. More particularly, the present invention relates to a pickup tool that uses hooks to engage fibers of a pliable item to pick up and place the pliable item, for example for construction of a shoe upper.

BACKGROUND OF THE INVENTION

While automated manufacturing processes have benefitted a number of industries, the automated manufacturing of soft goods made from pliable items has proven challenging to automate. For example, the manufacturing of shoes and, more particularly, shoe uppers, has long involved a large amount of hand labor. Because shoe uppers are often formed largely or entirely from multiple pliable items that are affixed together to form the completed shoe upper, even the fundamental manufacturing operation of picking up a part for a shoe upper and appropriately placing that part relative to other components has been a challenge to automate.

BRIEF SUMMARY OF THE INVENTION

The present invention generally relates to automated systems to pick up and place pliable items. More particularly, the present invention relates to systems that use at least the hook portions of a hook and loop fastener system to pick up and place one or more pliable item with fibers that may be engaged by the hooks. Pliable items picked up and placed using systems and methods in accordance with the present invention may particularly comprise components of a soft good, such as a shoe upper.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
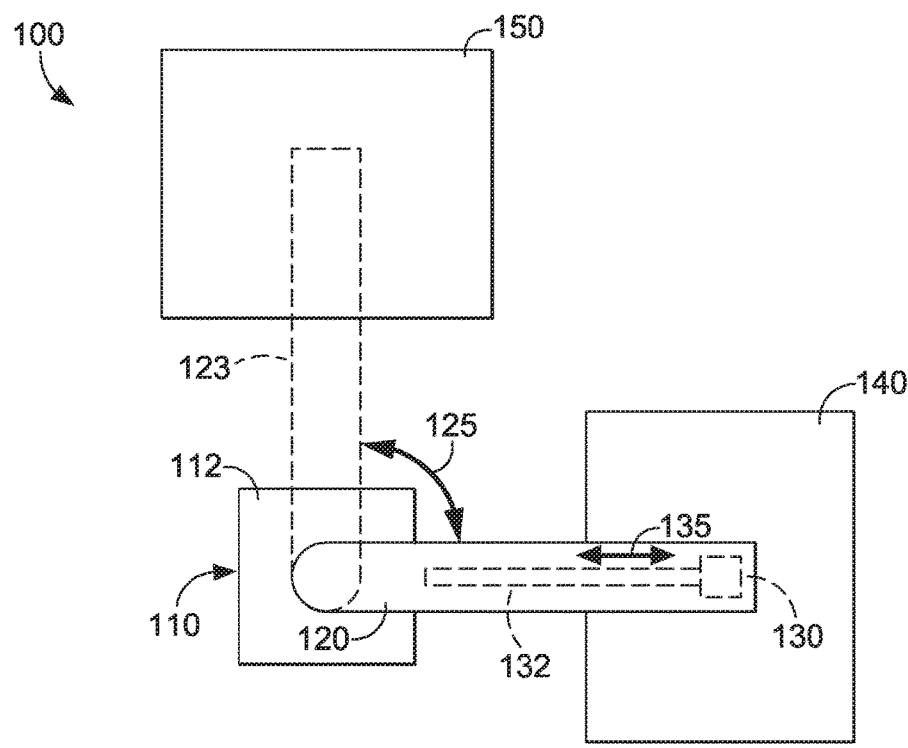
FIG. 1 illustrates an example of a system in accordance with the present invention.

The present invention provides systems and/or methods to pick up and place one or more pliable items. A pliable item processed in accordance with the present invention may possess a plurality of fibers. A pliable item in accordance with the present invention may be comprised entirely of fibers that are knit, woven, or otherwise combine to form the pliable item, or may be formed only in part from fibers with other materials, such as sheets or membranes, forming part, all or most of a pliable item. The fibers used to engage and move a pliable item with systems and/or methods in accordance with the present invention may ultimately be removed from all or part of the pliable item in further processing after placement, if desired.

Systems in accordance with the present invention may comprise at least one hook portion with a plurality of hooks extending from the surface of the hook portion. The hooks extending from the at least one hook portion may comprise the hook portion of a hook and loop fastener system. The size, shape, configuration, etc. of the plurality of hooks may be selected, at least in part, based upon the size and arrangement of fibers found in the pliable item to be processed. Hooks in accordance with the present invention may be formed from a variety of materials, such as plastics, nylons, metallic, ceramic, etc. At least one contact surface or pusher may be adjacent to one or more of the at least one hook portions. The contact surfaces/pushers may lack the plurality of hooks extending from the hook portion(s) and, therefore, not engage fibers of the pliable item. The hook portion(s) and the contact surface(s)/pusher(s) may be provided on a tool head.

The contact surface and hook portions may be positional relative to one another so as to permit the tool head to be placed in one of at least two configurations. In a first configuration, the contact surface(s) may be positioned such that the plurality of hooks of the hook portion(s) may at least partially engage fibers of a pliable item. In a second configuration, the contact surface(s) may be positioned relative to the hook portion(s) such that the hooks of the hook portion(s) are unable to engage the fibers of a pliable item. In a system and/or method in accordance with the present invention, a tool head may be placed in a first configuration at a first location to permit at least some of the hooks to at least partially engage fibers in a pliable item. After engaging the pliable item with at least some of the hooks, the tool head may be moved with the pliable item engaged by the hooks of the hook portion(s) and moved to a second location. In this fashion, systems and methods in accordance with the present invention may be used to, for example, engage and remove pliable items from a starting location, such as a supply area, and a place those pliable items at a placement location, such as an assembly station, in an appropriate desired arrangement for assembly into a partially or fully formed shoe upper or other soft good.

In some examples of systems and/or methods in accordance with the present invention, a contact surface(s) or pusher(s) may be moved by an actuator while the hook portion(s) of a tool head remain static. In other examples of systems and/or methods in accordance with the present invention, the hook portion(s) may be moved by an actuator relative to contact surface(s) or pusher(s). In yet further examples of systems and/or methods in accordance with the present invention, an actuator may move both of the hook portion(s) and the contact surface(s)/pusher(s) to place a tool head in various configurations. Further, a tool head used with systems and/or methods in accordance with the present invention may be capable of being placed in more than two configurations.

The number, shape, size, arrangement, and configuration of hook portion(s) may vary in accordance with the present invention. In some examples, a hook portion may have a size and shape that corresponds to the size and shape of a pliable item to be positioned using a system and/or method in accordance with the present invention. In some examples, a single hook portion may be sufficient to engage fibers in a pliable item in accordance with the present invention. In other examples, a plurality of hook portions may be used to engage the fibers of a pliable item in accordance with the present invention. For example, a plurality of non-adjacent hook portions may be provided on a tool head, with the plurality of non-adjacent hook portions being of sufficiently small size such that multiple hook portions of the plurality of hook portions may be expected to engage the fibers of any given pliable item to be placed in accordance with the present invention. For example, a tool head used in systems and methods in accordance with the present invention may provide a plurality of hook portions arranged in a checkerboard fashion with adjacent contact surfaces lacking hooks with a scale considerably smaller than the pliable item to be processed, for example, with each hook portion having a dimension less than one-half or one-quarter of the pliable item to be processed.

Similarly, contact surface(s)/pusher(s) used in conjunction with systems and methods in accordance with the present invention may have different sizes, shapes, configurations, and arrangements. In some examples, a single contact surface may be provided that adjoins one or more hook portions. In other examples, a single contact surface may be provided that adjoins a single hook portion. In yet further examples, a plurality of contact surfaces may adjoin a single or many hook portions. In accordance with the present invention, contact surface(s)/pusher(s) may have sizes and/or shapes that permit an adequate number of hooks in any associated hook portion(s) engage sufficiently with fibers of a pliable item.

Systems and methods in accordance with the present invention may provide a tool head positional in three dimensions to engage a pliable item, move the pliable item, and place the pliable item at a different location. A variety of apparatuses, such as robotic arms, x-y tables, swinging arms, and the like, may be employed to position a tool head in three dimensions. Further, the positioning of a tool head in two dimensions comprising a plane substantially parallel to the plane defined by the pliable item may be performed independent from movement of the tool head relative to a line perpendicular to that plane. For example, an x-y table may be used to position a tool head at a desired location in a horizontal plane. Meanwhile, the tool head may be moved to various heights relative to the x-y table (or any other point of reference, such as a surface holding or receiving a pliable item) independent from its horizontal positioning.

In some examples, systems and methods in accordance with the present invention may place a tool head in a first configuration that permits at least some hooks in at least one hook portion to engage fibers of a pliable item at a first height and a first location. After engaging at least some of the fibers of the pliable item with at least some of the hooks of the hook portion(s) of the tool head, the pliable item may be lifted by the tool head to a second height. At the second height, the tool head may move the engaged pliable item in a horizontal plane over a placement location and may then lower the pliable item to a third height at the placement location. At the placement location, the tool head may be actuated to the second position to disengage the hooks of the hook portion(s) from the fibers of the pliable item, thereby placing the pliable item at the placement location. Further, a tool head may be rotatable to permit a pliable item to be rotated while retained in order to place the pliable item at the placement location with a desired orientation. The desired placement location at which a pliable item is placed using systems and methods in accordance with the present invention may be defined relative to other components of a fully or partially assembled product, such as a shoe upper.

A variety of systems may be used to define and/or identify the locations at which a tool head should engage and/or disengage a pliable item. For example, vision systems utilizing cameras, lasers, or other types of detectors may be used to identify pliable items to be picked up and/or to locate the position at which to ultimately place the pliable item. Alternatively/additionally, a computing device may be provided with predetermined locations to pick up and/or place a pliable item for controlling the operations of systems and/or methods in accordance with the present invention. Any type of predefined location system, location detection system, or other technology may be used to determine and/or define a starting location (and orientation) to pick up a pliable item and/or a placement location (and orientation) to place a pliable item in accordance with the present invention.

The fibers of a pliable item that are at least partially engaged by hooks extending from a hook portion of a tool head in accordance with the present invention may comprise any type of fiber. For example, natural or synthetic fibers may be woven or knitted into a textile that is used, in whole or in part, to form the pliable item. Natural fibers may be, for example, any type of cotton, wool, linen, etc., while synthetic fibers may be any type of man-made fiber, such as any type of nylon, polyester, plastic, etc. Further, fibers may be formed from one or more filament of one or more type of material. Non-woven and non-knitted materials with fibers may also be used. Further, fibers may be added to an otherwise non-fiber containing pliable item in order to permit that pliable item to be processed using systems and methods in accordance with the present invention. The configuration of the fibers of a pliable item, the size of those fibers, the density of those fibers, the accessibility of those fibers, the strength of those fibers, and other properties may be determined in conjunction with the size, density, amount, strength, and other properties of the hooks to be provided on a hook portion of a tool head in systems and/or methods in accordance with the present invention.

In some examples, a pliable item may comprise a material, such as a rubber, plastic, cast polyurethane, etc. with a fiber containing material (such as a knit or woven textile) bonded to the item formed from rubber, plastic, cast polyurethane, etc. The fiber containing material may be permanently or temporarily bonded to such a rubber, plastic, cast polyurethane, etc. In such a case, systems and/or methods in accordance with the present invention may be used to remove materials or components of a shoe or other manufactured product from a mold or form for further processing and/or assembly.

Referring now to FIG. 1, an exemplary system 100 in accordance with the present invention is illustrated. In the example illustrated in FIG. 1, a robotic arm assembly 110 may comprise a positionable arm 120 that positions a tool head 130. Arm 120 may be rotatable as indicated by arrows 125 to at least a second position 123, for example. Tool head 130 may be further movable along the length of the arm 120 along a track 132 as indicated by arrow 135. Alternatively, tool head 130 may move only in a single direction, such as along track 132, or may move only along one or more tracks at an angle relative to each other rather than or in addition to be rotatable. Tool head 130 may optionally be rotatable as well, permitting tool head 130 to rotate on arm 120. Accordingly, arm 120 may be positioned over a first station 140 to engage and pick up a pliable item (not shown) and then arm 120 may rotate 125 and/or tool head 130 may move along track 132 while engaging the pliable item to place the pliable item at a second station, where the pliable item may be disengaged with the arm 120 at the second position 123. In some examples, first station 140 may comprise a supply source for pliable items to be arranged at a second station 150, which may comprise a stacking or assembly station. However, first station 140 and second station 150 may comprise any type of station performing any of a variety of functions, such as a demolding station for parts made from rubber, plastic, cast polyurethane, etc., with a fiber containing material affixed to those parts. Further systems and methods in accordance with the present invention may involve more than two stations. For example, second station 150 may comprise only one of a plurality of stations at which pliable items obtained from first station 140 may be placed. A plurality of stations such as second station 150 may be used to assemble a plurality of the same or different products, to sort pliable items by type, size, shape, or for other purposes. Further, more than a single station, such as first station 140, may provide a source of pliable items. Also, a single station may be both a source and a destination for pliable items in accordance with the present invention.

Systems and methods in accordance with the present invention may utilize tool heads that provide at least one hook portion adjacent to at least one contact surface or pusher. A hook portion may provide a plurality of hooks having a size, shape, configuration, and/or arrangement selected to engage the fibers of the pliable item to be picked up and positioned. The contact surface/pusher may comprise a surface without hooks that, therefore, does not engage the fibers of the pliable item. The tool head, or at least the hook portions/contact surfaces of the tool head, may be actuated between at least a first configuration and a second configuration. In the first configuration, the hooks of a hook portion may be able to engage the fibers of a pliable item. In a second configuration, the contact surface may be positioned relative to a hook portion so as to prevent the hooks extending from the hook portion from engaging the fibers of the pliable item. Examples of different types of tool heads that may be used in accordance with the present invention are illustrated with regard to FIG. 2 and to FIG. 3.

Figure 2:
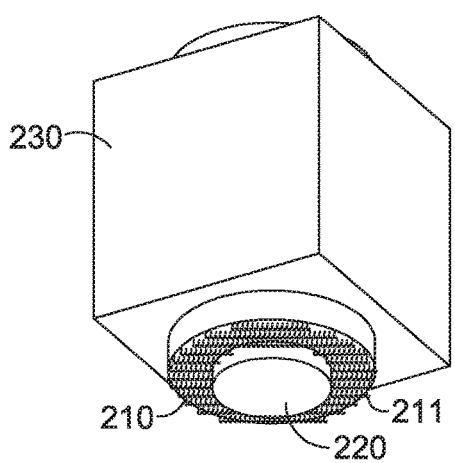
FIG. 2 illustrates an example of a tool head in accordance with the present invention.

Referring now to FIG. 2, a tool head 230 may comprise a hook portion 210 with a plurality of hooks 211 extending from its surface and a pusher 220. In the example shown in FIG. 2, tool head 230 comprises a single hook portion 210 of an essentially annular shape that is adjacent to and surrounds circular pusher 220. The hook portion 210, or any hook portion, that is functional for contacting an item to be manipulated (e.g., a pliable item) is comprised of a hook contacting surface, which is the surface of the hook portion able to engage the item. Similarly, the pusher 220, or any other contact surface, that is functional for contacting an item to be manipulated is comprised of a contacting surface, which is the surface of the pusher that is able to disengage the item. In the example illustrated in FIG. 2, pusher 220 may be moved relative to hook portion 210 to extend beyond the hooks of hook portion 210 or may be withdrawn to a position behind the hooks 211 of hook portion 210. Pusher 220 may be moved by an actuator that is hydraulic, mechanical, electromagnetic, or operates under any other principle.

Figure 3:
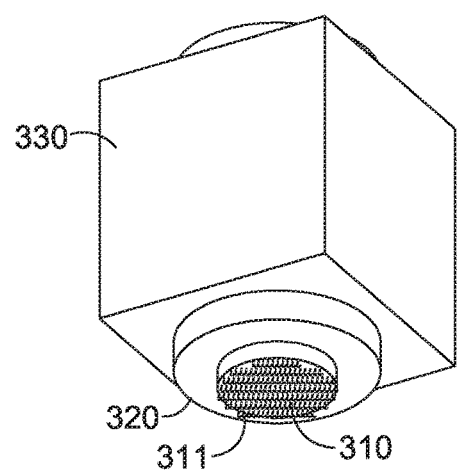
FIG. 3 illustrates a further example of a tool head in accordance with the present invention.

Referring now to FIG. 3, another example of a tool head 330 for use in accordance with the present invention is illustrated. In the example of FIG. 3, tool head 330 comprises a hook portion 310 that is essentially circular in shape with a plurality of hooks 311 extending from its surface. In this example, hook portion 310 is surrounded by a pusher 320 that is essentially annular in shape. In the example of FIG. 3, an actuator, which may be similar to the actuator described with regard to FIG. 2, may move hook portion 310 relative to pusher 320 to permit the hooks 311 extending from hook portion 310 to engage the fibers of a pliable item in a first configuration or to be unable to engage the fibers of a pliable item in a second configuration.

While the examples of FIG. 2 and FIG. 3 illustrate a tool head that moves a central portion between a first configuration and a second configuration, with the central portion being a pusher 220 in FIG. 2 and the central portion being a hook portion 310 in FIG. 3, the outer portion of a tool head may be actuated, either instead of or in addition to the central portion. In some examples, both a hook portion and a contact surface or pusher may be moved simultaneously in different directions in order to actuate a tool head between a first configuration and a second configuration. Further, additional configurations beyond the first configuration and a second configuration may be used in systems and methods in accordance with the present invention. For example, some applications of the present invention may vary the amount of the hooks of a hook portion permitted to engage the fibers of a pliable item based upon the nature of those fibers and/or the nature of the pliable item to be engaged. By way of further example, some applications of the present invention may provide hooks having varying sizes, either in the same or different hook portions, such that some configurations permit some, but not all, of the hooks to engage fibers of a pliable item, thereby permitting such a tool head to engage different hook portions with fibers in different configurations.

Figure 4:
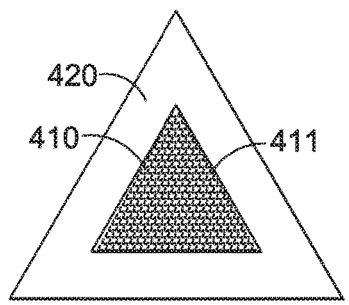
FIGS. 4-7 illustrate examples of various shapes that may be used for tool heads in accordance with the present invention.
Figure 5:
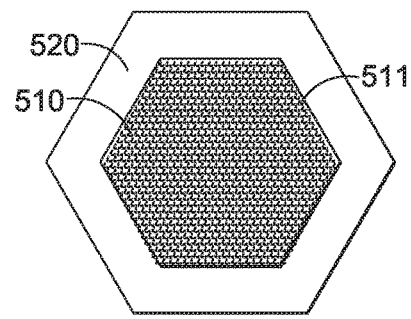
Figure 6:
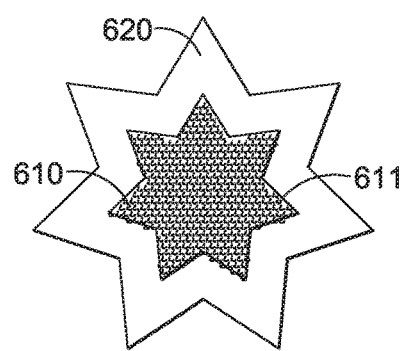
Figure 7:
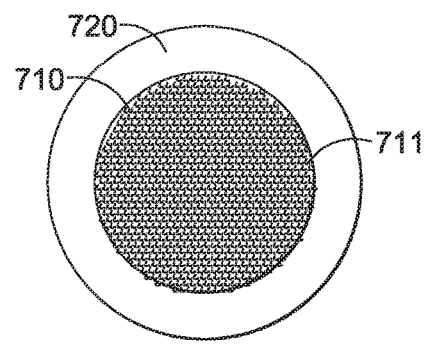

The shape of one or more hook portion and/or contact surface of a tool head used in systems and/or methods in accordance with the present invention may be varied without departing from the scope of the present invention. For example, a hook portion and/or contact surface may be varied in conjunction with the size, shape, and/or configuration of a pliable item to be processed. Further, the size, shape, and/or configuration of the hook portion of a tool head used in systems and/or methods in accordance with the present invention may be varied based upon the size, shape, and/or configuration of the fibers of a larger pliable item to be processed in accordance with the present invention, i.e., when fibers comprise only a portion of the pliable item to be processed. FIGS. 4-7 illustrate a few examples of different configurations and shapes of hook portions that may be used in accordance with the present invention to match the size, shape, and/or configuration of a pliable item or the fibers of a pliable item. For example, FIG. 4 illustrates a triangular hook portion 410 with hooks 411 and a pusher 420. By way of further example, FIG. 5 illustrates a hexagonal hook portion 510 with hooks 511 and a pusher 520. In yet a further example, FIG. 6 illustrates a star-shaped hook portion 610 with hooks 611 and a pusher 620. In yet a further example, FIG. 7 illustrates a circular hook portion 710 with hooks 711 and a pusher 720. The various pushers illustrated in FIGS. 4-7 may take shapes different from the shape of the hook portion to which that pusher is adjacent. Further, any shape may be used for a hook portion, particularly in conjunction with variously-shaped pliable items/fiber portions of pliable items. As can be seen in FIGS. 4-6, for a non-circular hook portion the rotation of a tool head may impact the engagement of hooks from the hook portion with the fibers of a pliable item.

Figure 8:
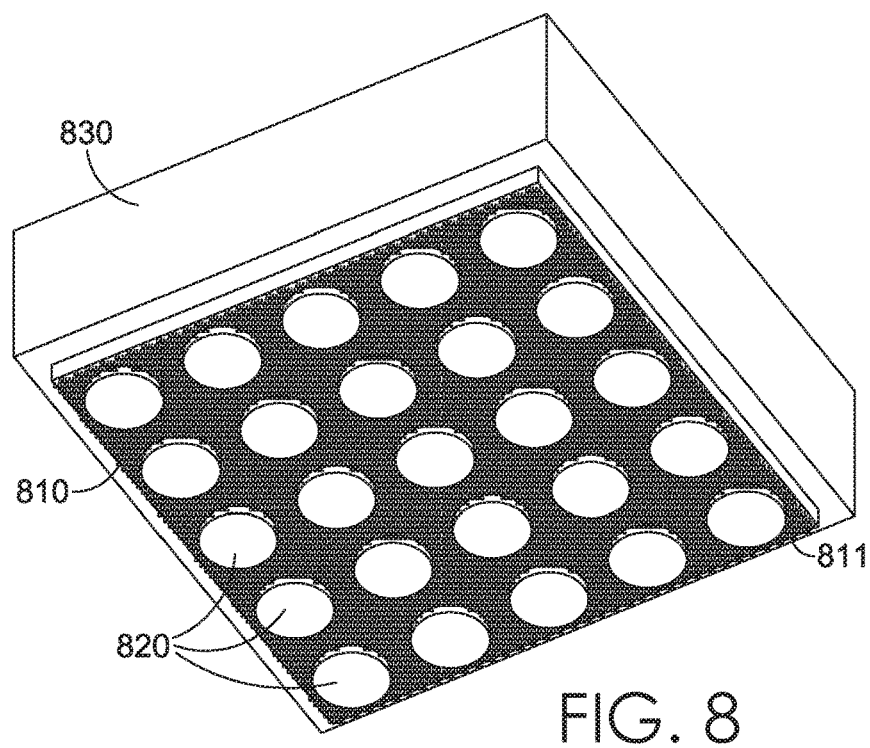
FIGS. 8-11 illustrate examples of various arrangements of examples of hook portions and contact surfaces that may be used for tool heads in accordance with the present invention.

Tool heads for use in accordance with systems and/or methods of the present invention may use more than one hook portion and/or more than one contact surface. For example, FIG. 8 illustrates a tool head 830 with a plurality of contact surfaces 820 adjacent to and surrounded by a hook portion 810 with a plurality of hooks 811 extending from its surface. In the example of FIG. 8, the contact surfaces 820 may be actuated relative to hook portion 810, or vice versa, or both hook portion 810 and contact surfaces 820 may be actuated between a first configuration and a second configuration.

Figure 9:
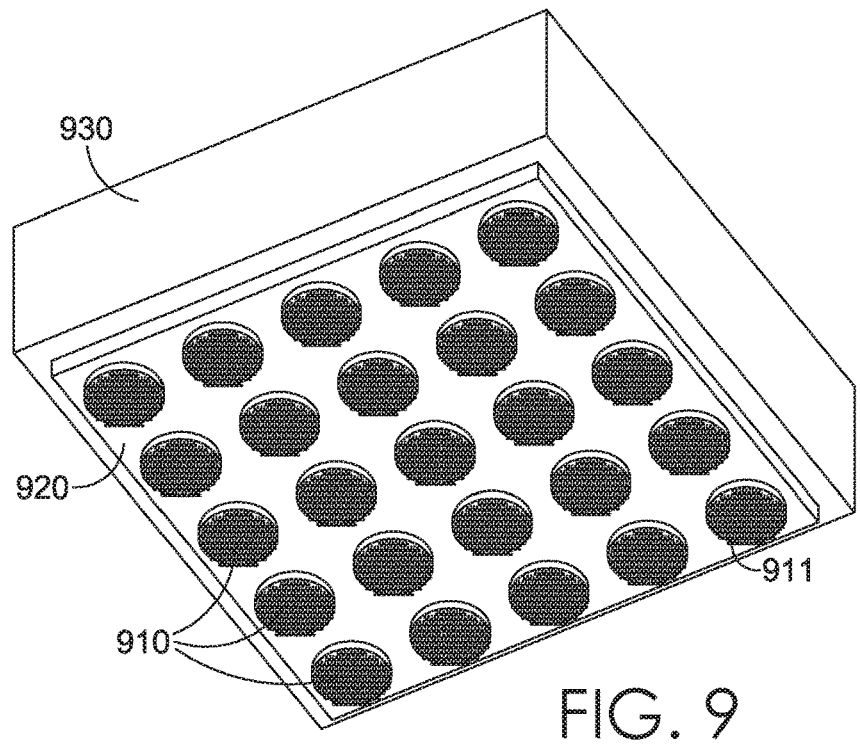

Referring now to FIG. 9, a further example of a tool head 930 that may be used for systems and methods in accordance with the present invention is illustrated. Tool head 930 provides a plurality of hook portions 910 with a plurality of hooks 911 extending from their surfaces. A contact surface 920 may be adjacent to and surround hook portions 910. In the example of FIG. 9, hook portions 910 may be actuated relative to contact surface 920, or contact surface 920 may be actuated relative to hook portions 910, or both hook portions and contact surface 910 may be simultaneously actuated between a first configuration and a second configuration.

Figure 10:
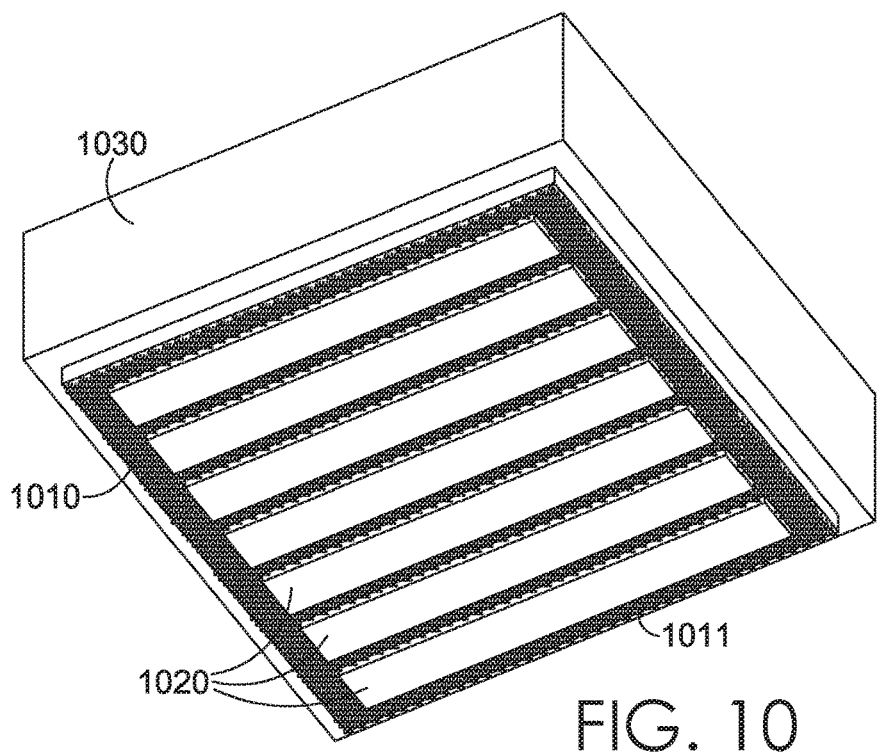

Referring now to FIG. 10, yet a further example of a tool head 1030 in accordance with the present invention is illustrated. The example of FIG. 10 illustrates a tool head 1030 with a single hook portion 1010 with a plurality of hooks 1011 extending from its surface and a plurality of rectangular contact surfaces 1020 surrounded by hook portion 1010. In the example of FIG. 10, contact surfaces 1020 may be actuated relative to hook portion 1010, hook portion 1010 may be actuated relative to contact surfaces 1020, or both contact surfaces 1020 and hook portion 1010 may be simultaneously actuated between a first configuration and a second configuration.

Figure 11:
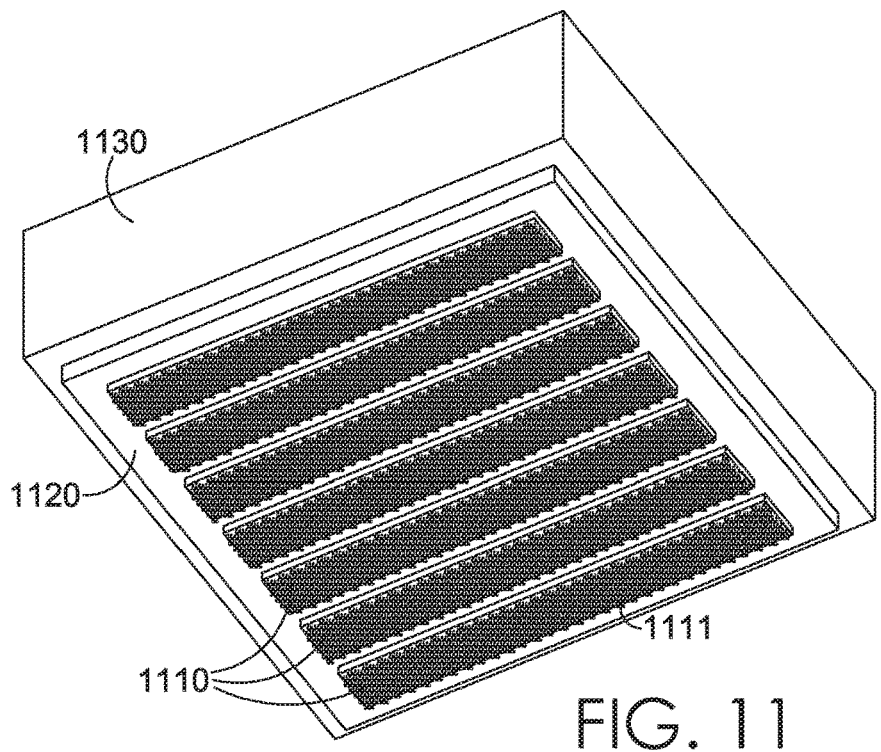

Referring now to FIG. 11, a further example of a tool head 1130 in accordance with the present invention is illustrated. In the example illustrated in FIG. 11, a plurality of hook portions 1110 may have a rectangular shape with a plurality of hooks 1111 extending from their surfaces. A single contact surface 1120 may surround hook portions 1110. In the example of FIG. 11, hook portions 1110 may be actuated relative to contact surface 1120, contact surface 1120 may be actuated relative to hook portions 1110, or hook portions 1110 and contact surface 1120 may be simultaneously actuated between a first configuration and a second configuration.

It is further contemplated that the hook portions 1110, while depicted as linearly continuous in FIG. 11, may instead be discontinuous in the linear directions. For example, a single hook portion may be comprised of several discrete portions having a plurality of hooks. It is contemplated that any size, shape, and orientation of discrete portions may be formed into a hook portion, in an exemplary aspect.

Referring now to FIGS. 12A-12D, an example of actuation of a tool head between a first configuration and a second configuration is illustrated. In the first configuration illustrated in FIG. 12A, a hook portion 1210 having a plurality of hooks 1211 provided thereon extends beyond a contact surface 1220 of a tool head 1230. Therefore, the hooks 1211 of hook portion 1210 may engage the fibers of a pliable item 1290 once tool head 1230 is lowered a distance 1250 to bring the hooks 1211 of hook portion 1210 into contact with the fibers of pliable item 1290; this may be referred to as an engaging configuration. It is contemplated that the hook portion 1210 and the contact surface 1220 may form in combination the engaging surface, regardless of the configuration they are placed (e.g., an engaging configuration or a disengaged configuration)

Figure 12A:
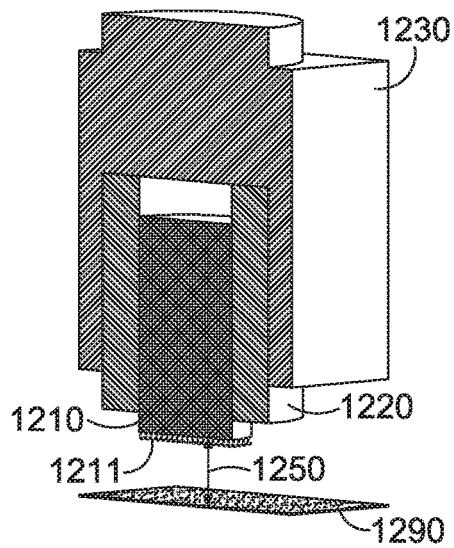
FIGS. 12A-12D illustrate an example of a tool head being actuated in accordance with the present invention.
Figure 12B:
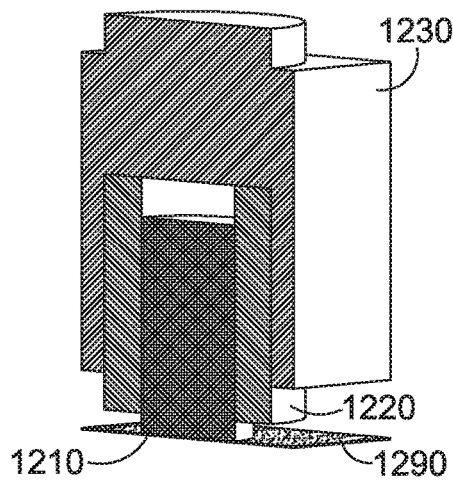
Figure 12C:
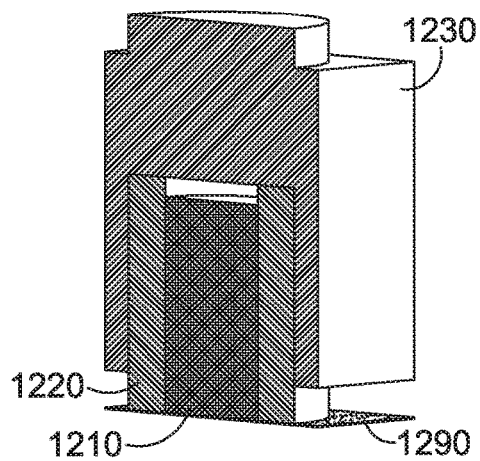

As shown in FIG. 12B, tool head 1230 has been moved the distance 1250 to permit the hooks of hook portion 1210 to contact the fibers of pliable item 1290. As shown in FIG. 12B, tool head 1230 has been moved to engage pliable item 1290, but tool head has not been actuated from the first configuration, so the hooks 1211 of hook portion 1210 may engage the fibers of pliable item 1290. In FIG. 12C, the tool head 1230 has partially actuated from the first configuration to the second configuration. As can be seen in reference to FIG. 12C, hook portion 1210 has been partially withdrawn into tool head 1230 (or tool head 1230 has been moved over hook portion 1210) while contact surface 1220 has not moved. Accordingly, tool head 1230 as shown in FIG. 12C is in a configuration intermediate between the first configuration that permits the hooks 1211 of hook portion 1210 to engage the fibers of pliable item 1290 and a second configuration (i.e., a disengaged configuration) that does not permit the hooks 1211 of hook portion 1210 to engage the fibers of pliable item 1290.

Figure 12D:
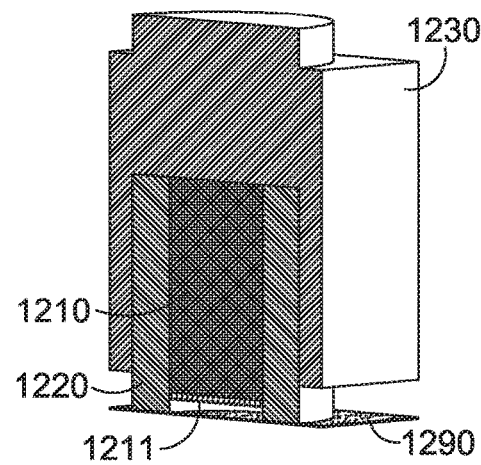

The second configuration of tool head 1230 is illustrated in FIG. 12D. As shown in FIG. 12D, hook portion 1210 has been fully actuated to place tool head in the second configuration to withdraw hook portion 1210 into tool head 1230 such that contact surface 1220 prevents hooks 1211 extending from hook portion 1210 from engaging fibers of pliable item 1290. The first configuration depicted in FIG. 12A and FIG. 12B may be physically located at a different position than the second configuration illustrated in FIG. 12D and the intermediate third configuration illustrated in FIG. 12C. For example, FIG. 12A and FIG. 12B may depict the tool head 1230 initially engaging a pliable item 1290 at a starting location, while FIG. 12C and FIG. 12D may illustrate the disengagement of the pliable item 1290 from the tool head 1230 after pliable item 1290 has been moved to a placement location.

Figure 13A:
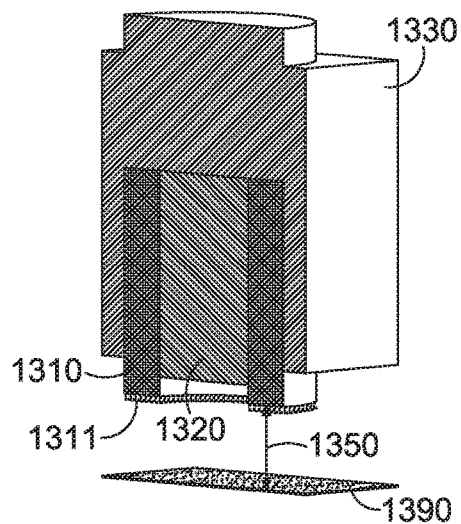
FIGS. 13A-13D illustrate a further example of a tool head being actuated in accordance with the present invention.
Figure 13B:
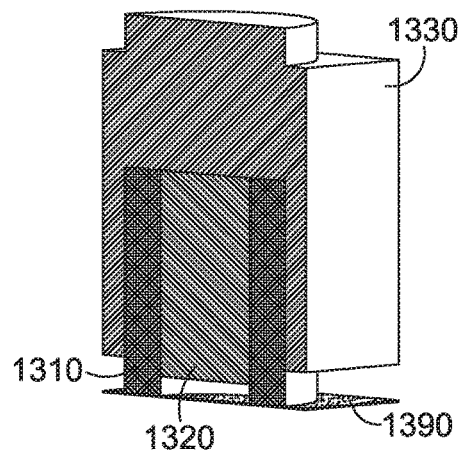

Referring now to FIGS. 13A-13D, a further example of the actuation of a tool head 1330 in accordance with the present invention is illustrated. As shown in FIG. 13A, a tool head 1330 may be placed in a first configuration (i.e., engaging configuration) such that hooks 1311 extending from a hook portion 1310 may contact and engage fibers of a pliable item 1390 if tool head 1330 is moved a distance 1350 toward pliable item 1390. As shown in FIG. 13B, after tool head 1330 has been moved the distance 1350 the hooks 1311 extending from hook portion 1310 may engage fibers of pliable item 1390 because contact surface 1320 is withdrawn behind hook portion 1310 in the first configuration of tool head 1330.

Figure 13C:
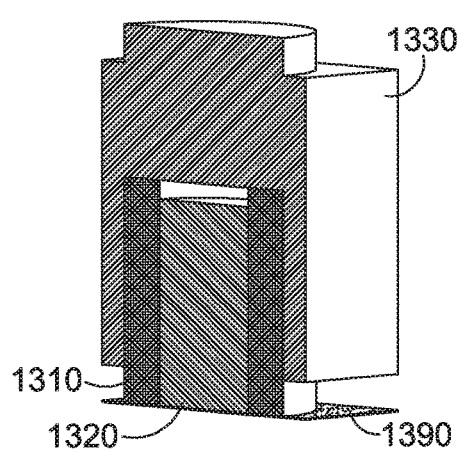
Figure 13D:
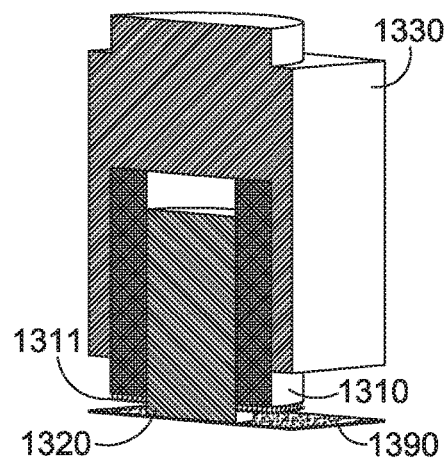

As shown in FIG. 13C, contact surface 1320 may be moved from the first configuration. FIG. 13C illustrates an intermediate or third configuration wherein contact surface 1320 has been actuated into alignment with hook portion 1310 to contact pliable item 1390. As shown in the example of FIG. 13D, after the actuation is complete, tool head 1330 may be placed into the second configuration (i.e., disengaged configuration) wherein contact surface 1320 prevents hooks 1311 extending from hook portion 1310 from engaging the fibers of pliable item 1390. In this example, the pliable item 1390 may be at a starting location in FIG. 13A and FIG. 13B when it is engaged by the hooks extending from hook portion 1310. The pliable item 1390 may be moved to a placement location when tool head 1330 is actuated to disengage pliable item 1390 from hook portion 1310, as shown in FIG. 13C and FIG. 13D.

Figure 14:
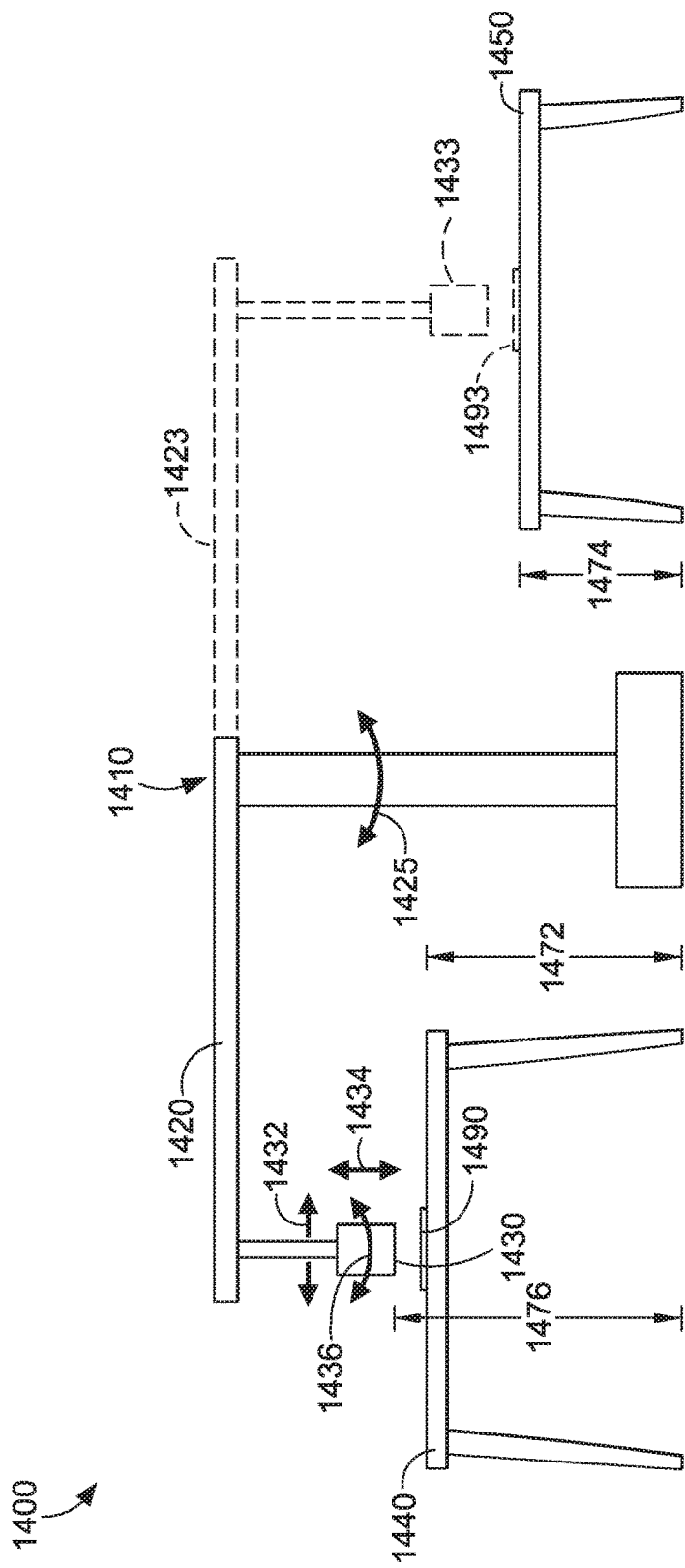
FIG. 14 illustrates a further example of a system in accordance with the present invention.

Referring now to FIG. 14, a further example of a system 1400 in accordance with the present invention is illustrated. Similar to the example system 100 illustrated in FIG. 1, the example system 1400 may provide a mechanical system 1410 with a positionable arm 1420. Tool head 1430 may be positionable along arm 1420 as indicated by arrows 1432. Tool head 1430 may also be rotated 1436 on arm 1420 to be in a desired rotational alignment to engage and/or disengage a pliable item. Tool head 1430 also may be moved vertically as indicated by arrows 1434. Arm 1420 may be rotated 1425 from a first position to a second position 1423. A station 1440 may retain a pliable item 1490 at a starting location. Tool head 1430 may comprise at least one hook portion and at least one contact surface, such as but not limited to those described in examples herein. Tool head 1430 may be actuatable between a first configuration that permits at least some hooks extending from hook portions to engage fibers in pliable item 1490 and a second configuration that prevents hooks from a hook portion from engaging fibers of pliable item 1490. As shown in the example of FIG. 14, arm 1420 may be rotated as indicated by arrows 1425 to permit tool head 1430 to be positioned at a first location to engage fibers of pliable item 1490 at the starting location. Arm 1420 may thereafter be rotated as indicated at position 1423, with tool head moved to a placement location 1433 to disengage a pliable item 1493 at a placement location on a second station 1450. In the example of FIG. 14, starting location has a first height 1472 while placement location has a second height 1474 that is different from first height. Further, in the example of FIG. 14, system 1400 may move a pliable item 1490 from a starting location to a placement location at a third height 1476 that is higher than both the first height 1472 and the second height 1474. Alternatively, second height 1474 may be greater than first height 1472, rather than as shown in the present example wherein first height 1472 is greater than second height 1474.

Figure 15:
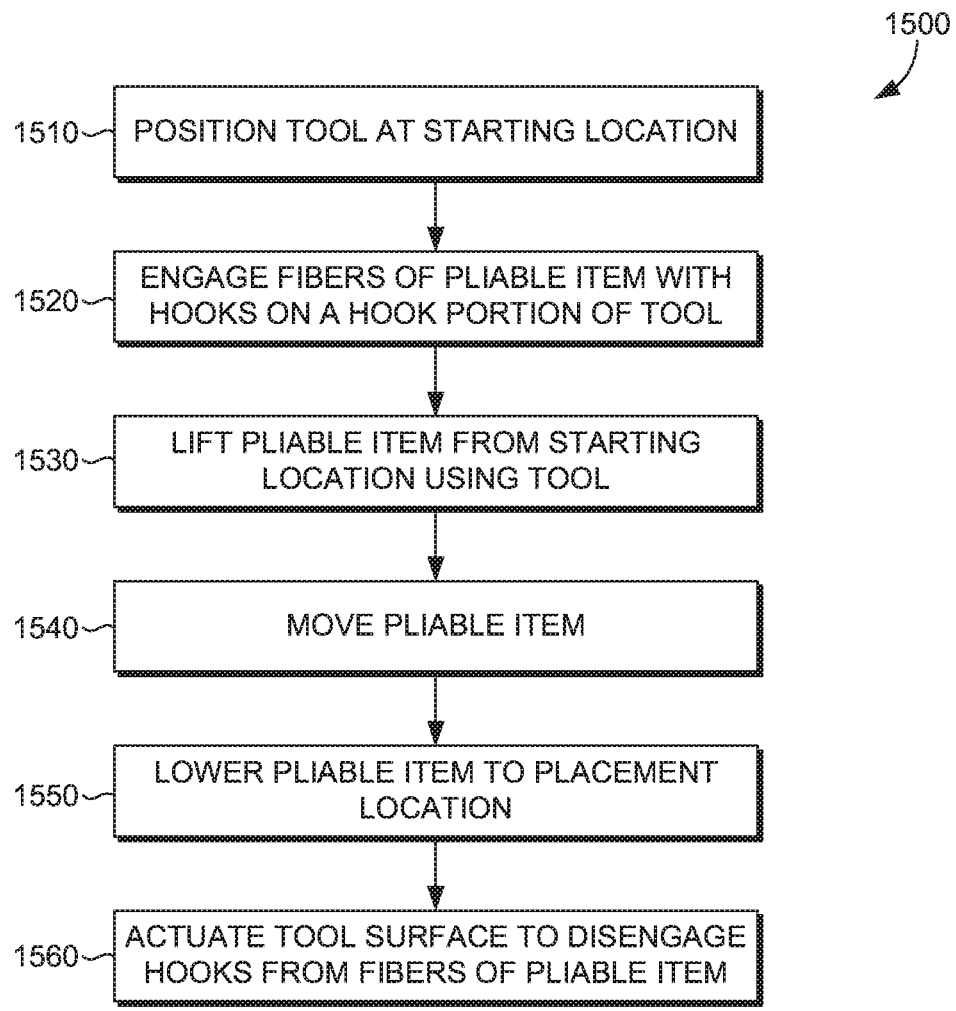
FIG. 15 illustrates an example of a method in accordance with the present invention.

Referring now to FIG. 15, an example method 1500 in accordance with the present invention is illustrated. In step 1510 a tool head may be positioned at a starting location. The starting location may have a pliable item to be positioned, with the pliable item having or being formed, at least in part, from fibers. The tool head positioned in step 1510 may have at least one hook portion having a plurality of hooks with a size, shape, orientation, configuration, and/or composition to permit the hooks to engage the fibers of the pliable item. In step 1520, the fibers of the pliable item may be engaged by at least some of the hooks on the tool head. For example, step 1520 may bring a tool head with a first configuration that permits hooks of a hook portion to engage the fibers of a pliable item into contact with the pliable item in the starting location.

In step 1530, the pliable item may be lifted from the starting location using the tool head. In step 1540 the pliable item may be moved to another location. Steps 1530 and 1540 may be performed by moving the tool head while at least some of the hooks of the hook portion of the tool head engage at least some fibers of the pliable item. In step 1550 the pliable item may be lowered to a placement location. The placement location may be determined relative to other items, whether pliable or rigid, with which the pliable item is to be assembled. In step 1560 the tool head surface may be actuated to disengage the hooks from the fibers of the pliable item. Step 1560 may bring a contact surface beyond the hooks of a hook portion to disengage the hooks from the fibers of the pliable item.

Method 1500 may pick up a pliable item for assembly into a soft good, such as a shoe upper, at a starting location. A starting location may be, for example, a supply station or other source of components of a shoe upper. Method 1500 may thereafter engage the pliable item, pick up the pliable item, move the pliable item to a placement location, and disengage the pliable item. The result of method 1500 may be to place a pliable item adjacent to another component of a soft good (such as a shoe upper) for further assembly.

Figure 16A:
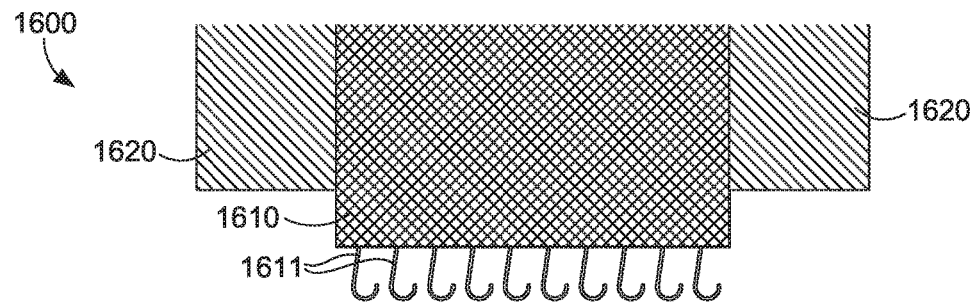
FIGS. 16A-16C illustrate an example of the engagement and disengagement of the fibers of a pliable item in accordance with the present invention.
Figure 16B:
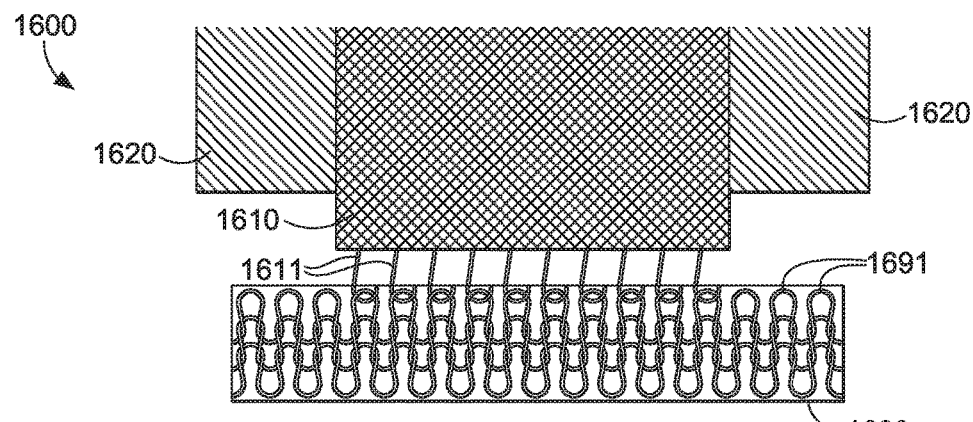
Figure 16C:
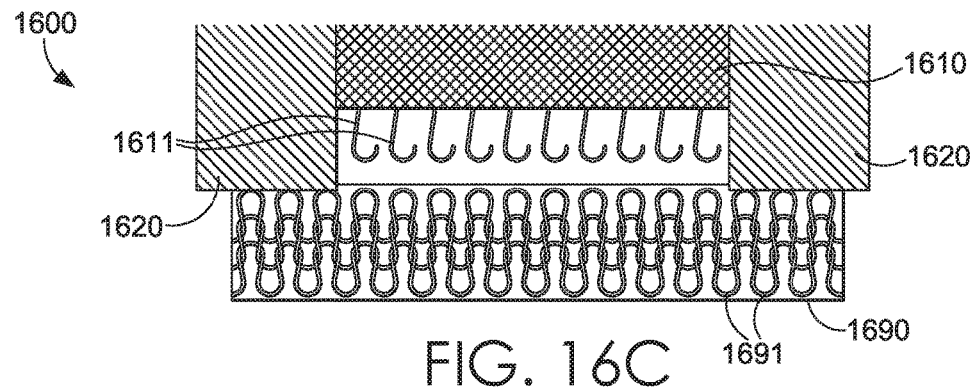

Referring now to FIGS. 16A-16C, the engagement of fibers 1691 of a pliable item 1690 by hooks 1611 of a hook portion 1610 of a tool head 1600 is illustrated. In FIG. 16A, a pair of contact surfaces 1620 and a hook portion 1610 are in a first configuration that permits at least some of a plurality of hooks 1611 extending from hook portion 1610 to ultimately engage the fibers 1691 of a pliable item 1690. However, any number of hook portions may be used in conjunction with any number of contact surfaces in systems and methods in accordance with the present invention. The fibers 1691 of pliable item 1690 may comprise any type of natural or synthetic fiber that may be woven, knitted, spun, or otherwise formed into all or part of pliable item 1690. Further, fibers 1691 may be added (permanently or temporarily) to a pliable item formed from other types of fibers, a membrane, a sheet material, etc. In FIG. 16B the hooks 1611 have been brought into contact with the fibers 1691 of pliable item 1690 to permit at least some of the hooks 1611 to at least partially engage fibers 1691. The arrangement of the tool head 1600, the hooks 1611, and the pliable item 1690 shown in FIG. 16B may be achieved by lowering a tool head 1600, as described in examples above, or by raising a station or other surface retaining pliable item 1690 to engage hooks 1611 with fibers 1691 of pliable item 1690, or some combination thereof. FIG. 16C shows the tool head 1600 actuated into a second configuration that prevents hooks 1611 from engaging fibers 1691, affectively disengaging pliable item 1690 from tool head 1600. The actuation of tool head 1600 to the second configuration illustrated in FIG. 16C may be achieved by moving hook portion 1610, by moving contact surfaces 1620, and/or by moving both hook portion 1610 and contact surfaces 1620. The example depicted in FIG. 16C may be at a different location than the example depicted in FIG. 16A and/or the example depicted in FIG. 16B. For example, the depiction shown in FIG. 16A may occur at a starting location, while the example depicted in FIG. 16B may be at either the starting location or an intermediate point while the pliable item 1690 is being moved, while the example depicted in FIG. 16C may occur at a placement location.

Figure 17:
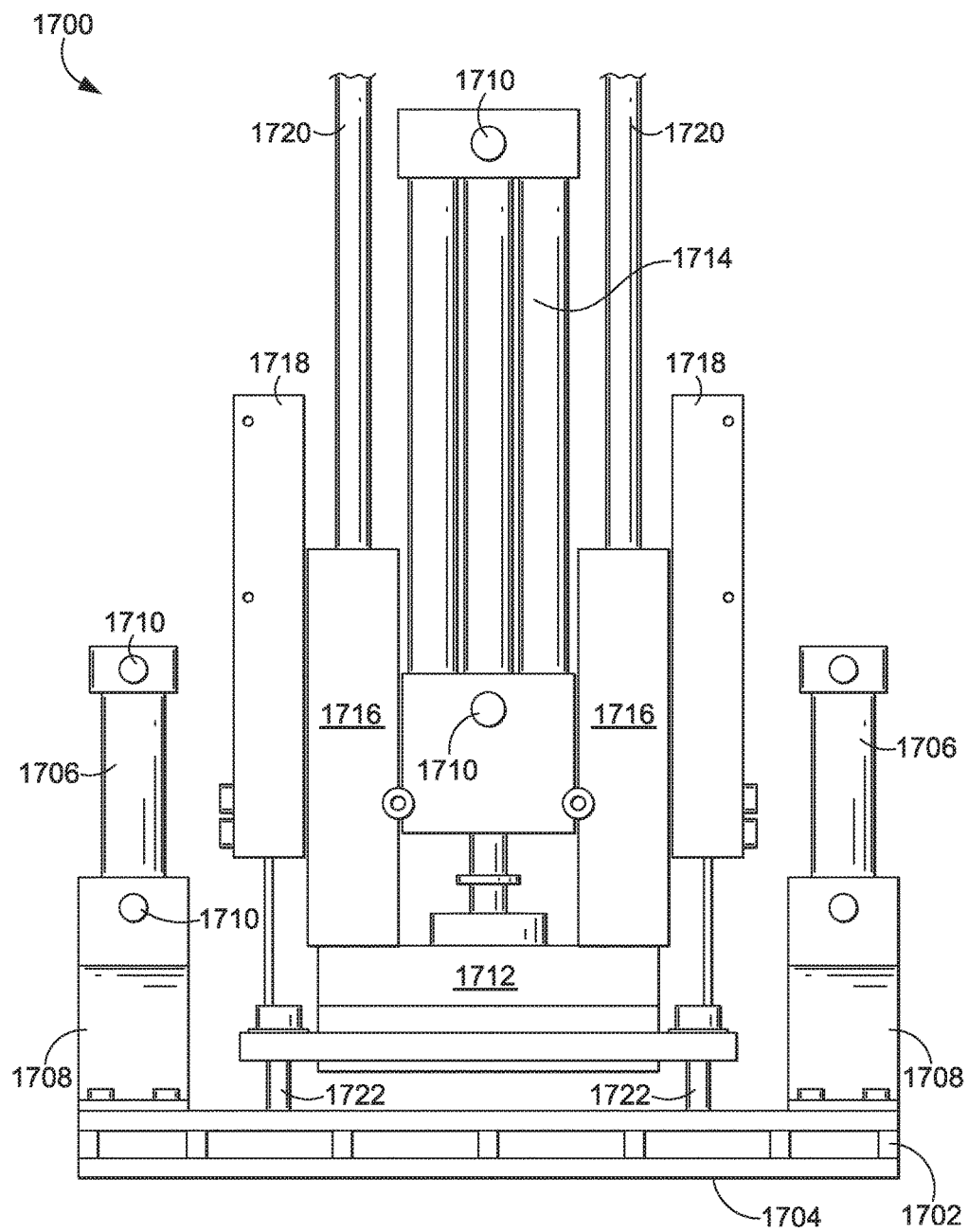
FIG. 17 illustrates an exemplary side profile of a pick-up tool with a tool head having actuators for engaging/disengaging the hook portions and for moving the tool head in general, in accordance with aspects of the present invention.

FIG. 17 illustrates an exemplary side profile of a pick-up tool 1700 with a tool head having actuators for engaging/disengaging the hook portions and for moving the tool head in general, in accordance with aspects of the present invention. The tool head depicted in FIG. 17 is exemplary in nature. Alternative movement mechanisms and alternative structures are contemplated to achieve aspects provided herein. For example, two engaging actuators are depicted for engaging and disengaging a secured item from the hook portion by the contact surface. However, more or fewer engaging actuators may be implemented in alternative aspects. Further, it is contemplated that different structural members and components may be utilized to achieve a result of a moveable tool head and a moveable relationship between the hook portions and the contacting surface.

The pick-up tool 1700 is comprised of tool head portion and a tool movement and support structure portion. The tool head portion, in this example, is comprised of a head frame 1702, an engaging actuator 1706, an actuator support 1708, a head support 1712, and a connecting member 1722, which will be discussed in greater detail hereinafter. The tool movement and support structure portion is comprised of a head actuator 1714, a head actuator support 1716, a frame member 1718, and a head guide 1720, which will be discussed in greater detail hereinafter. While specific components are identified with the tool head portion and the tool movement and support structure portion, it is appreciated that some components may be omitted and additional components may be included to achieve a pick-up tool with disengageable hook portions.

Returning to the tool head portion, it is contemplated that any structure provided herein may be utilized. For example, the tool heads of FIGS. 10 and 11 may be implemented in exemplary aspects. Stated differently, it is contemplated that the hook portions may be manipulated by the engaging actuators relative to a contact surface and/or the contact surface may be manipulated by the engaging actuators relative to the hook portions, as depicted in FIG. 11 and FIG. 10, respectively.

The head frame 1702 provides support and a volume for recessing the engaging surface portion of the tool, such as the hook portions. For example, the head frame 1702 may be a structure having side portions and a top portion and a bottom portion. As depicted in FIG. 17, the bottom portion forms a contact surface 1704 that is useable for disengaging a secured item from a hook portion as the hook portion is recessed between the contacting surface and a top surface of the head frame 1702. However, as previously indicated, it is contemplated that the bottom portion of the head frame 1702 may form the hook portions, in an alternative aspect.

Coupled with the head frame, such as at the top portion, is an actuator support that maintains an engaging actuator 1706. The engaging actuator 1706 is fixedly coupled with the head frame 1702 by way of the actuator support 1708. The engaging actuator 1706 is positionally coupled with the engaging portion of the tool head, such as the hook portion in this example. The positionally coupling allows the engaging actuator 1706 to raise and lower the hook portion relative to the contacting surface 1704 such that when the engaging actuator 1706 positions the hook portion below the contact surface 1704 to engage with and secure an item. Additionally, it is contemplated that the engaging actuator 1706 positions the hook portion above the contact surface 1704, as is currently depicted, to disengage a maintained item from the hook portion. The engaging actuator 1706 may be driven may any means previously discussed, such as pneumatic pressure, hydraulic pressure, electrical current, and the like. In the current example, a pneumatic actuator having a plurality of fluid connections 1710 is depicted as the engaging actuator 1706; however alternative mechanisms are contemplated.

The tool head portion is positionally coupled with the tool movement and support structure portion by way of a connecting member 1722 extending between the head frame 1702 and a head support 1712. The head support is coupled with a head actuator 1714 and coupled with a head guide 1720. As the head actuator 1714 extends or retracts, the head support 1712 is moved relative to the tool movement and support structure portion. To aid in position guidance during this movement, the head guide 1720 is slidably maintained by a head actuator support 1716, such that the head guide 1720 slides through a channel formed with the head actuator support 1716. This movement of the head actuator 1714 causes the tool head portion to move in an up and down motion to position the head tool proximate an item or surface to be manipulated by the hook portions of the tool head.

The head actuator 1714 is coupled with the head actuator support 1716. The head actuator support 1716 is adjustably coupled with a frame member 1718. It is further contemplated, as provided in FIG. 14 herein above, that the frame member 1718, or a comparable portion, may be coupled with a robot, such as a multi-axial robot, in an exemplary aspect. As previously provided, it is contemplated that one or more features may be omitted or added to one or more portion of the pick-up tool assembly, in an exemplary aspect.

While the present invention has been described with regard to specific examples herein, various configurations of tool heads may be used in accordance with the present invention. A tool head may provide a single hook portion to engage a pliable item having a size, shape, and/or configuration resembling the hook portion, but a plurality of hook portions may be used to generally engage a pliable item. For example, a plurality of hook portions may be provided in an array, a graduated distribution pattern, an irregular distribution pattern, or in any other arrangement such that hooks from more than one hook portion may be anticipated to engage a single pliable item using systems and/or methods in accordance with the present invention. By engaging the fibers of a pliable item with the hooks of multiple hook portions, a more secure engagement of the pliable item may be attained, and the pliable item may be better placed at a placement location without the pliable item shifting laterally or vertically during movement. A tool head may manipulate a pliable item in ways beyond simply moving a pliable item from a first starting location to a second placement location. For example, a tool head may rotate a pliable item and/or alter the angle of inclination of a pliable item prior to/while placing the pliable item at a placement location.

Further, a variety of systems may be used to locate, at a starting location, a pliable item to engage at a starting location and/or to locate a placement location at which to disengage a pliable item. Any sort of detection system, such as computer vision systems, may be used to identify a pliable item to be engaged and/or to identify and locate other components of a soft good with which to place a pliable item relative to at a placement location. Alternatively/additionally, the location of pliable items to be picked up and/or placed may be anticipated with sufficient precision that those locations may be predetermined for a system and/or method in accordance with the present invention. Computing systems executing computer readable code retained in computer readable memory may be used to control the operation of systems and the performance of methods in accordance with the present invention.

What is claimed is:

1. A pickup tool for moving items, comprising:
a tool head comprising:
a plurality of distinct hook portions that are each elongated,
the plurality of distinct hook portions movably coupled to the tool head,
each one of the plurality of distinct hook portions having a hook-contacting surface with a plurality of hooks, and
the plurality of hooks configured to engage fibers forming at least a portion of a pliable item;
at least one pusher,
the at least one pusher having a pusher-contacting surface, and
the pusher-contacting surface at least partially circumscribing the hook-contacting surface of each of the plurality of distinct hook portions,
wherein each hook-contacting surface of the plurality of distinct hook portions is spaced from at least one other hook-contacting surface of the plurality of distinct hook portions by a respective portion of the pusher-contacting surface that remains in fixed position on the tool head during movement of the plurality of distinct hook portions; and
at least one actuator coupled to the plurality of distinct hook portions, the at least one actuator operable to move the plurality of distinct hook portions between a first position and a second position relative to the pusher-contacting surface, the first position positioning each hook-contacting surface past the pusher-contacting surface to facilitate attachment of the pliable item, and the second position positioning the pusher-contacting surface past each of the hook-contacting surfaces to facilitate release of the pliable item.

2. The pickup tool of claim 1, wherein the at least one actuator is coupled to an engaging portion of the plurality of distinct hook portions with at least one coupling, the at least one coupling allowing the at least one actuator to raise and lower the plurality of distinct hook portions relative to the pusher-contacting surface.

3. The pickup tool of claim 1, wherein each one of the plurality of distinct hook portions is substantially rectangular.

4. The pickup tool of claim 3, wherein the plurality of distinct hook portions are arranged in a parallel configuration.

5. The pickup tool of claim 1, wherein each hook-contacting surface of the plurality of distinct hook portions is planar in the first position and in the second position.

6. The pickup tool of claim 1, wherein the pusher-contacting surface comprises a single continuous surface that surrounds the plurality of distinct hook portions, and wherein the pusher-contacting surface further defines a plurality of openings through which the plurality of distinct hook portions are actuated.

7. The pickup tool of claim 1, wherein the plurality of distinct hook portions are equally spaced on the tool head.

8. The pickup tool of claim 1, wherein the at least one actuator comprises a mechanical actuator.

9. The pickup tool of claim 1, wherein the at least one actuator physically moves the plurality of distinct hook portions between the first position and the second position.

10. The pickup tool of claim 1, wherein the at least one actuator comprises a pneumatic or hydraulic actuator.

11. A pickup tool for picking up and placing pliable items, the pickup tool comprising:
a tool head comprising:
a plurality of elongated hook portions, each one of the plurality of elongated hook portions having a respective hook-contacting surface with a plurality of hooks;
at least one pusher having a pusher-contacting surface that at least partially circumscribes the hook-contacting surface of each of the plurality of elongated hook portions, wherein each hook-contacting surface of the plurality of elongated hook portions is spaced from at least one other hook-contacting surface of the plurality of elongated hook portions by a respective portion of the pusher-contacting surface that remains in fixed position on the tool head during movement of the plurality of elongated hook portions; and
at least one actuator coupled to the plurality of elongated hook portions, the at least one actuator configured to move the plurality of elongated hook portions between a first position and a second position relative to the pusher-contacting surface, the first position positioning each hook-contacting surface past the pusher-contacting surface to facilitate attachment of the pliable item, and the second position positioning the pusher-contacting surface past each of the hook-contacting surfaces to facilitate release of the pliable item.

12. The pickup tool of claim 11, wherein each of the hook-contacting surfaces remains planar in the first position and in the second position.

13. The pickup tool of claim 11, wherein the plurality of elongated hook portions are non-contiguous and arranged in a parallel configuration.

14. The pickup tool of claim 11, wherein the plurality of elongated hook portions are movable in coordination.

15. The pickup tool of claim 11, wherein each one of the plurality of elongated hook portions is substantially rectangular in shape.

16. A pickup tool for engaging, moving, and disengaging an item having a plurality of fibers, the pickup tool comprising:
a tool head comprising:
a plurality of elongated hook portions each having a hook-contacting surface with a plurality of hooks positioned thereon, the plurality of hooks configured to engage fibers forming at least a portion of a pliable item;
at least one pusher having a pusher-contacting surface, wherein each hook-contacting surface of the plurality of elongated hook portions is spaced from at least one other hook-contacting surface of the plurality of elongated hook portions by a respective portion of the pusher-contacting surface that remains in fixed position on the tool head during movement of the plurality of elongated hook portions; and
an actuator that moves the plurality of elongated hook portions between a first configuration and a second configuration, wherein the actuator is coupled to an engaging portion of the plurality of elongated hook portions, allowing the actuator to raise and lower the plurality of elongated hook portions relative to the pusher-contacting surface, the first configuration positioning each hook-contacting surface below the pusher-contacting surface to allow the plurality of hooks of each elongated portion to engage the fibers of the pliable item, and the second configuration positioning the hook-contacting surface above the pusher-contacting surface to prevent the plurality of hooks of each elongated portion from engaging the fibers of the pliable item.

17. A method of moving items using a pickup tool, the method comprising:

positioning the pickup tool at a starting location, the pickup tool comprising:

a tool head comprising:

a plurality of elongated hook portions each having a hook-contacting surface with a plurality of hooks, at least one pusher having a pusher-contacting surface at least partially circumscribing the plurality of elongated hook portions, and at least one actuator coupled to the plurality of elongated hook portions, wherein each hook-contacting surface of the plurality of elongated hook portions is spaced from at least one other hook-contacting surface of the plurality of elongated hook portions by a respective portion of the pusher-contacting surface that remains in fixed position on the tool head during movement of the plurality of elongated hook portions, and wherein the at least one actuator is operable to move the plurality of elongated hook portions between a first position and a second position relative to the pusher-contacting surface, the first position positioning each hook-contacting surface past the pusher-contacting surface to facilitate attachment of a pliable item, and the second position positioning the pusher-contacting surface past each of the hook-contacting surfaces to facilitate release of the pliable item;

engaging the pliable item with at least a portion of the plurality of hooks;

moving the pliable item to a placement location; and actuating, using the at least one actuator, the plurality of elongated hook portions from the first position to the second position to disengage the pliable item.

18. The method of claim 17, wherein the plurality of elongated hook portions can be actuated to a position at which each hook-contacting surface is co-planar with the pusher-contacting surface.

19. The method of claim 17, wherein the plurality of elongated hook portions are arranged in a parallel and non-contiguous arrangement.

20. The method of claim 17, wherein each one of the plurality of elongated hook portions is substantially rectangular in shape.

21. The method of claim 17, wherein the plurality of elongated hook portions are equally spaced.

* * * * *